United States Patent
Kelleher et al.

(10) Patent No.: US 9,161,555 B2
(45) Date of Patent: Oct. 20, 2015

(54) PROCESS FOR ISOLATING A PROTEIN COMPOSITION AND A FAT COMPOSITION FROM MEAT TRIMMINGS

(75) Inventors: Stephen D. Kelleher, Ipswich, MA (US); William R. Fielding, Hilton Head, SC (US)

(73) Assignee: Proteus Industries, Inc., Gloucester, MA (US)

( * ) Notice: Subject to any disclaimer, the term of this patent is extended or adjusted under 35 U.S.C. 154(b) by 250 days.

(21) Appl. No.: 13/374,077

(22) Filed: Dec. 12, 2011

(65) Prior Publication Data
US 2012/0171352 A1     Jul. 5, 2012

Related U.S. Application Data

(60) Provisional application No. 61/460,324, filed on Jan. 3, 2011.

(51) Int. Cl.
A23J 1/02     (2006.01)

(52) U.S. Cl.
CPC .............. *A23J 1/02* (2013.01); *A23V 2002/00* (2013.01)

(58) Field of Classification Search
USPC ......................................... 426/546
See application file for complete search history.

(56) References Cited

U.S. PATENT DOCUMENTS

| | | | |
|---|---|---|---|
| 5,384,149 A * | 1/1995 | Lin | ................ 426/646 |
| 6,005,073 A | 12/1999 | Hultin et al. | |
| 6,136,959 A | 10/2000 | Hultin et al. | |
| 6,288,216 B1 | 9/2001 | Hultin et al. | |
| 6,451,975 B1 | 9/2002 | Hultin et al. | |
| 6,855,364 B2 | 2/2005 | Kelleher et al. | |
| 7,163,707 B2 | 1/2007 | Kelleher et al. | |
| 7,473,764 B2 | 1/2009 | Hultin et al. | |
| 7,556,835 B2 | 7/2009 | Hultin et al. | |

* cited by examiner

*Primary Examiner* — Elizabeth Gwartney
(74) *Attorney, Agent, or Firm* — George A Herbster

(57) ABSTRACT

A protein fraction and an oxidation stable fat fraction are recovered from meat trimmings. The trimmings are comminuted, mixed with a food grade acid at pH 3,6 to 4.4 to form a liquid protein fraction and a solid fat fraction. The liquid fraction is mixed with a food grade alkali to precipitate the protein. A myoglobin rich fraction is recovered from the protein fraction and mixed with the precipitated protein.

21 Claims, 1 Drawing Sheet

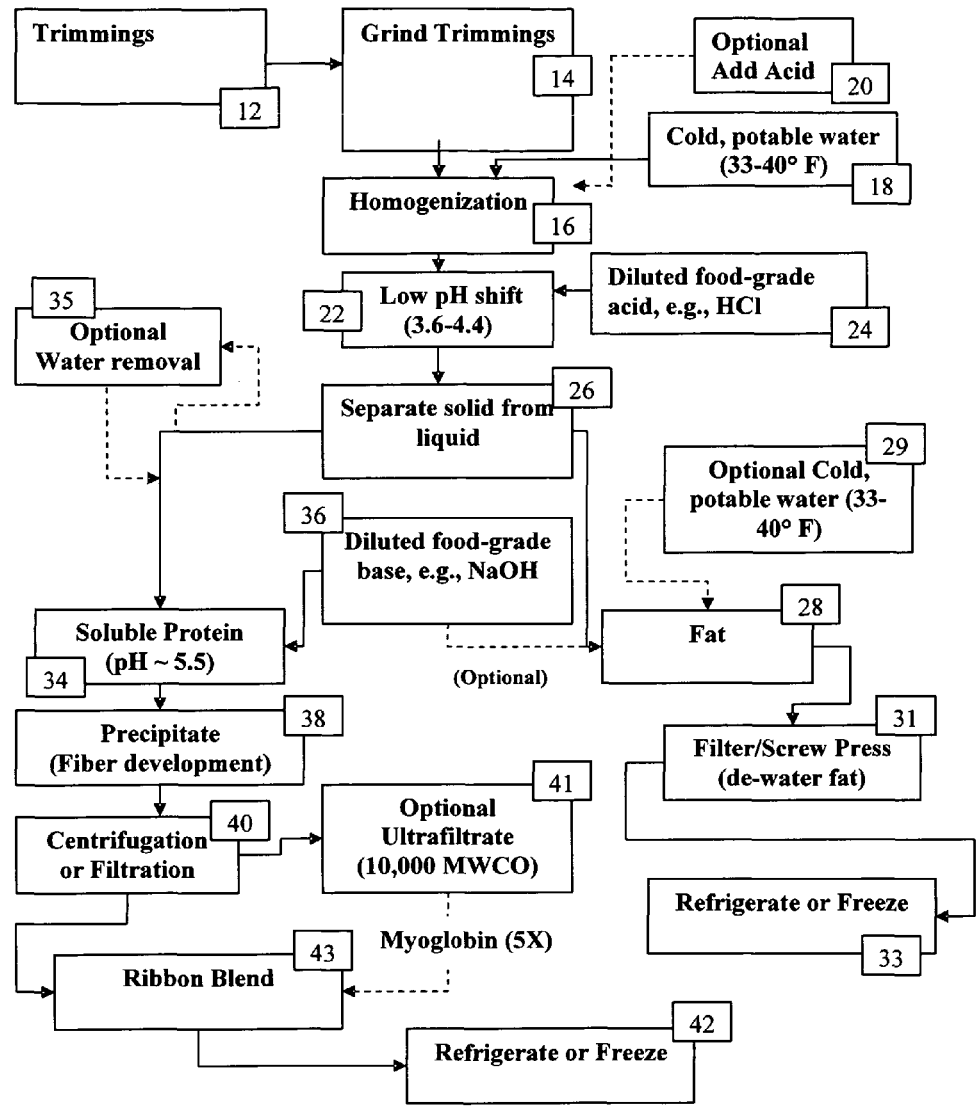

US 9,161,555 B2

PROCESS FOR ISOLATING A PROTEIN COMPOSITION AND A FAT COMPOSITION FROM MEAT TRIMMINGS

REFERENCE TO RELATED APPLICATION

This application claims the benefit of the filing date of U.S. Application Ser. No. 61/460,324, filed Jan. 3, 2011.

FIELD OF THE INVENTION

This invention relates to a process for isolating a protein composition and a stable fat composition from a fatty composition comprising meat trimmings containing animal muscle tissue. More particularly, this invention relates to such a process wherein the animal muscle tissue is solubilized in an acid and the liquid acidic protein composition so obtained is separated from solid animal fat under conditions (a) to inactivate microorganisms, (b) to reduce sodium concentrations, (c) to stabilize the fat against oxidation and (d) to obtain solubilized animal muscle tissue having a satisfactory color.

DESCRIPTION OF PRIOR ART

At the present time, protein recovered from animal muscle tissue is obtained by solubilizing the animal muscle tissue in an edible acidic composition such as citric acid, hydrochloric acid or mixtures thereof. Such processes are disclosed in U.S. Pat. Nos. 6,005,073; 6,288,216; 6,451,975 and 7,473,364. While these processes are well adapted for recovering protein from animal muscle tissue, they are not well adapted for recovering, with high efficiency, protein and fat from meat trimmings. These meat trimmings contain a high concentration of animal muscle tissue, typically between 30-50% by weight of the trimmings with the remaining composition comprising primarily fat. Thus, it is desirable to recover the protein from the animal muscle tissue for use as a food additive rather than discarding it. It is also desirable to recover purified and stabilized fat from the trimmings which has economic value such as for a food additive or for producing tallow.

Presently, animal muscle protein is recovered from meat trimmings by a process which includes a step of dissolving the animal fat tissue using thermal energy, while further processing with the use of an alkaline agent e.g., ammonia, ammonium hydroxide, to control bacteria such as is disclosed in U.S. Pat. No. 5,871,795. This process may be undesirable since the recovered protein product can potentially have a smell of ammonia if the resting pH is too high. Thus, it can be used only sparingly as a food additive.

Another method for separating animal muscle tissue from fat is disclosed in U.S. Pat. No. 7,666,456. In this method, comminuted trimmings are mixed with warm water containing carbon dioxide. This water based composition has a density which is intermediate of the density of the fat and the density of the animal muscle tissue. The fat particles are separated from the animal muscle tissue particles on the basis of differing density wherein the fat particles float on the water based composition and the animal muscle tissue particles sink to the bottom of the water based composition. During the process both the fat particles and the animal muscle tissue particles remain in the solid state. It is also disclosed that the pH of the water based composition can drop to less than 2 and that this can reduce the bacterial population that is present at the animal muscle tissue surfaces.

A further problem with recovering animal muscle protein from fatty animal tissue is that the protein can contain microorganisms such as E. coli that are unsuitable for human consumption. One method for destroying microorganisms involves the use of ammonium hydroxide, which has the problem set forth above and, thus, is undesirable. Additional problems regarding samples treated with alkaline agents e.g., ammonia or ammonia hydroxide, are that these treated samples have reduced essential amino acid percentages and lower functionality or water binding ability.

The process disclosed in U.S. Pat. No. 6,949,265 discloses a method for reducing or eliminating surface bacteria and pathogens by pre-scalding trimmings. The muscle tissue is separated from fat tissue by heat to liquefy the fat tissue but below 110° F. so as to avoid cooking the muscle tissue while the muscle tissue remains solid. The liquid fat is then separated from the solid muscle tissue. This process may be undesirable since microorganisms grow rapidly at elevated temperatures between about 40° F. and about 140° F.

It is also desirable to process animal muscle tissue in a manner which retains functionality of the recovered protein product. Protein functionalities of most concern to food scientists are solubility, water holding capacity, gelation, foam stability and emulsification properties.

It is also desirable to process the animal tissue in a manner which results in a final product that has large fibers, which better resembles fine ground or coarse ground beef.

It is also desirable to provide a process for producing a fat fraction having a relatively low concentration of water and which is stable against oxidation. Such a form of fat permits its addition to a variety of food products such as beef products.

The U.S. government provides that a certain quality of meat product obtained from animal trimmings can be used undeclared in meat products of the same species. For example, "finely textured beef" and "lean finely textured beef" can be used in ground beef without being declared on the label. "Finely textured meat" is required to have a fat content of less than 30%; a protein content of 14% or greater, by weight; a protein efficiency ratio (PER) of 2.5 or higher, or an essential amino acids (EAA) content of 33% of the total amino acids or higher; must be prepared in a federally inspected plant; must not have a product temperature during processing exceeding 110° F.; must be frozen in less than 30 minutes after processing; must not allow a significant increase in bacterial numbers; and must not be treated with chemicals or additives that remain in the meat. "Lean finely textured meat" (LFTM) is required to have a fat content of less than 10%, by weight, and complies with the other requirements of "finely textured meat".

Accordingly, it would be desirable to provide a process for isolating animal muscle protein from fatty animal tissue containing animal muscle tissue such as trimmings which provides high yields of functional animal muscle protein while significantly destroying microorganisms. Furthermore, it would be desirable to provide a fat product from trimmings which is stable against oxidation and which has a relatively low concentration of water. Also, it would be desirable to provide an animal muscle protein product that has a similar or reduced sodium content as compared to the original meat. In addition, it would be desirable to provide such a process which eliminates undesirable smell characteristics such as the smell of ammonia. Furthermore it would desirable to produce a final beef product that has large fibers which results in a more desirable ground beef-like texture and mouth feel. Such a process would provide high recovery rates of fat stable against oxidation and of animal muscle protein in a low microorganism environment while avoiding the addition and retention of ingredients which adversely affect edibility of the protein product. In addition, it would be desirable to provide such an animal muscle tissue protein having a color which permits its satisfactory addition to high protein foods such as ground beef.

SUMMARY OF THE INVENTION

In accordance with this invention, a process is provided for isolating both animal muscle protein having a satisfactory color and fat stabilized against oxidation from meat trimmings comprising animal muscle tissue and fat. The process provides high yields of functional animal muscle protein having satisfactory color while avoiding problems due to the presence of microorganisms and avoiding problems which render the recovered proteins inedible. The process of this invention also provides a fat product which is stable against oxidation and which contains a relatively low water concentration. The process of this invention is capable of meeting the definition of "finely textured meat" or "lean finely textured meat" as presently defined by the U.S. government.

The process of this invention includes the process steps of comminuting fresh or frozen meat trimmings, adding cold potable water to the comminuted trimmings; optionally adding a food grade acid; homogenizing the trimmings-water mixture; adding a food grade acid to the homogenized trimmings to lower the pH of the resultant mixture to between 3.6 to 4.4, preferably between 3.6 and 3.8 to selectively dissolve the animal muscle tissue; separating the solid fat from the acidic solution of animal muscle protein; recovering the solid fat; optionally evaporating water from the acidic solution of animal muscle protein to form a concentrated protein solution; recovering the acidic solution of animal muscle protein or adding a food grade alkaline composition to the acidic animal muscle protein solution to increase the pH to between about 4.9 and about 6.4, preferably between about 5.2 and about 5.8 to form a salt from the reaction of the acid with the alkaline composition and to precipitate the protein, separating the solid protein from the remaining liquid such as by centrifugation and/or screen filtration and optionally freezing the resultant essentially neutral animal muscle protein composition.

It has been found that when reducing the pH of animal muscle tissue from 3.6 to 4.4 in accordance with this invention, the animal muscle tissue is solubilized while retaining essentially its original color and that satisfactory yields of muscle tissue (protein) are obtained. In order to render the solubilized animal muscle tissue useful for addition to ground animal muscle tissue such as beef hamburger, the solubilized animal muscle tissue should have a color of 75 to 52 L*, 25 to 10 a* and 23 to 16 b* wherein L*, a* and b* are defined according to the Commission Interntionale de l'Eclarage (CIE) as L* (luminance or muscle lightness), a* (redness or muscle redness), b* (yellowness or muscle yellowness). For example in the case of beef muscle tissue, the original red color is retained. In contrast, when the pH is about 3.5 or less, the tissue color becomes brown and does not revert to its original color. A protein composition having a brown color is not suitable for addition to a food having a normal red color such as hamburger. It has also been found that solubilization of the animal muscle tissue in acid results in a significant reduction of viable microorganisms, particularly when utilizing food grade hydrochloric acid as the acid. One particular food grade acid and base combination of interest in this present invention is citric acid to lower the pH and sodium bicarbonate to raise the pH. It has also been found that mixing the fat with food grade acid in accordance with this invention, stabilizes the fat against oxidation. In addition, it has been found that when mixing the fat containing acid with a food grade base to a pH between about 4.9 and about 5.8 effects separation of water from the fat from about 70 to about 50 weight % down to a water content between about 30 and about 20 weight percent. This result simplifies subsequent water removal from the fat if such additional water removal is desired. Lastly, in the process of this invention, the presence of undesirable acidic or alkaline additives in the final protein product is eliminated due to the neutralization of the acid with the alkaline.

BRIEF DESCRIPTION OF THE DRAWING

FIG. 1 is a process flow diagram of the process of this invention.

DETAILED DESCRIPTION OF SPECIFIC EMBODIMENTS

The present invention relates to a method for processing animal trimmings to recover meat products low in fat content and high in protein and essential amino acid content as well as a stabilized fat product. "Meat product" describes a protein-containing product which is suitable for human consumption as meat because it contains a certain amount of protein. Generally, "trimmings" refers to the tissue cut away from conventional cuts or parts of the carcasses of meat producing animals during butchering operations in packing houses and the like. The conventional cuts or parts are generally sold directly to consumers or further processed by, for example, grinding into ground beef. The tissue remaining after the conventional cuts are removed, or after the conventional cuts have been further trimmed, generally has a fat content which is too high for human consumption as meat, but contains proteins which can be recovered.

According to the present invention, once the trimmings are removed from the carcasses, they are preferably forwarded directly to the process of the present invention. Alternatively, the trimmings can be frozen or cooled and stored prior to processing. The temperature of the trimmings, upon removal from the carcasses is usually about 33-40° F. which corresponds to the temperature at which the carcasses are stored prior to butchering. Warmer or cooler trimmings can be used in the process of the present invention.

The trimmings can include any part of an animal which is trimmed away from the carcass of the animal or the cuts. The trimmings can include all the parts normally found in an animal, including adipose tissue, fat, lean ligaments, tendons, bone parts, and the like. It is generally desirable that if components other than fat, lean, and moisture are present, they are present in small quantities and/or can be removed in the desinewing step or by hand, if desired, or can be left therein if their presence does not adversely affect the properties of the meat product. If large amounts of certain components are present, it may be desirable to have them removed by conventional separation techniques prior to processing according to the present invention. For example, it is generally desirable not to have large amounts of bone present or large amounts of low quality ligaments.

"Meat producing animals" includes animals which are known to provide meat. Such animals include beef, pork, poultry such as chicken or turkey, e.g. mechanically deboned chicken, lamb, deer, buffalo, fish, and the like. The lean material can be referred to as protein-containing material, and can be in the form of water soluble protein which include muscle fiber, and non-water soluble protein which are generally the myofibrilar or locomotion proteins or the connective tissue which surrounds muscle fiber and which attach the muscle fibers to ligaments. Of particular interest for purposes of the present invention is the presence of the water soluble protein and the acid soluble protein from the animal muscle tissue in the fatty tissue within the fat trimmings. By separating this protein material from the animal trimmings, a high quality meat product can be provided. This product can be utilized as an additive to conventional meat products such as to hamburg.

Animal trimmings, which can be used in the present invention preferably, have an average fat content of between about 50 and 80% by weight, preferably between about 50 and 70% by weight. The lean content of the animal trimmings is preferably between about 20 and 50% by weight, and more preferably between about 30 and 50% by weight. The lean content includes protein and moisture. In order to ensure reliable and consistent results, it is preferable that the lean content of the animal trimmings is at least about 30% by weight and preferable at least about 39% by weight.

Referring to FIG. 1 which illustrates a preferred embodiment of this invention, boneless trimmings 12 such as beef trimmings containing about 50% by weight beef muscle tissue and about 50% by weight fat, mechanically separated chicken or the like are directed to a comminution step 14 which increases the surface area of the beef trimmings rendering it more suitable for further processing. Advanced Recovered Meat (AMR) also can be utilized as a feed. Suitable comminution apparatus include meat grinder available from Weiler and Company Corporation located in Whitewater, Wis. or Carnitec USA, Inc, located in Seattle, Wash. The starting meat trimmings are first ground to a size that enables it to be put through a micro-cutter. It is preferable to coarse cut ¾inch, followed by a ⅛ inch grind. Once ground, the material is mixed with water (33-40° F.) at a ratio of one part ground meat to approximately 5-6 parts water. This amount of water can vary and can go as high as approximately 1 part ground meat to 10 parts cold water. The addition of water lowers the ionic strength of the homogenate which is required for complete solubilization of the proteins. Optionally, acid can be added to the trimmings in step 20 to improve protein solubilization. The comminuted trimmings are directed to homogenization step 16 where it is mixed with potable water 18 at a water temperature typically between about 33° F. and about 40° F. and homogenized, typically to an average particle size of about 0.5 to about 4 millimeters preferably between about 1 to about 2 millimeters. A preference has been shown for a micro-cut with a 0.035 mm cutting head size. Representative suitable homogenizers for this purpose include emulsifiers or micro-cutters, available from Stephan Machinery Corporation, located in Columbus, Ohio or high-shear mixers available from Silverson, located in East Longmeadow, Mass. or the like.

In a step to control microorganisms, the temperature of the homogenate is kept cold throughout the process (33-40° F.). The cold temperature is most effective for separating the fat from the protein. This unit operation is accomplished while the pH is still near the pH of the initial muscle. An alternative is to add enough food-grade acid to bring the composite pH to the isoelectric point. Typically, the isoelectric point is about pH 5.5, but it can vary from species to species. At the isoelectric point, proteins are least able to form emulsions with lipid molecules, and, therefore, more lipid renders away from the proteins during the extraction process. Once the tissue is homogenized, it is ready to be adjusted to a low pH.

The resultant homogenate is directed to step 22 wherein it is mixed with a food grade acid 24 such as dilute hydrochloric acid, dilute phosphoric acid, dilute citric acid, ascorbic acid, tartaric acid or mixtures thereof or the like in order to reduce the pH of the homogenate to between pH 3.6 and pH 4.4, preferably between pH 3.6 and pH 3.8 to dissolve animal muscle tissue thereby to obtain a satisfactory yield of protein such as 80% yield or higher in an acidic protein solution thereof while retaining the fat portion in solid form. It is preferred to utilize hydrochloric acid since its use results in more significant reduction of viable microorganisms in the acidic protein solution.

Acidification of the proteins under low salt conditions has been shown to unfold the proteins, which is believed to create more surface area along the proteins and hence more potential water binding sites. Once the proteins are soluble, the fat renders away from the proteins and floats to the surface of an aqueous acidic solution. Other potential impurities, including any residual bone, skin or sinew, stay insoluble as well. The pH is adjusted to 3.6 to 4.4 to obtain the desired color of the final product. As an example, the approximate amount of acid needed to effect solubilization of the muscle proteins is approximately 0.15 to 0.80 weight %, e.g. 0.198 weight % based on the weight of HCl to total weight (pH 3.74). This amount is dependent on the desired low pH (pH 3.6 or 4.4) and also on the pH of the starting material. Suitable mixers to effect this step include Lightnin Mixers available from SPX Corporation, located in Charlotte, N.C. or the like.

The resultant mixture of acidic solution of animal muscle protein and solid fat then is directed to separation step 26 such as a decanter centrifuge and/or screen filter 26 to separate the acidic protein solution from the solid fat.

Subsequent to the solubilization of the proteins and removal of impurities and fat, the proteins are subjected to an increase in pH such as by the addition of diluted, food-grade base such as sodium hydroxide (NaOH) or sodium bicarbonate ($NaHCO_3$). The base is added until the isoelectric point is obtained and the proteins refold and rejoin with each other to form large, fiberized molecules. Upon reaching the isoelectric point pH, the proteins easily release their closely aligned water molecules, and the moisture content can be returned to the moisture content found in meat or consistent with LFTM. The solid fat in step 28 is optionally mixed with a food grade alkali to separate water from fat and to neutralize the fat. Optionally, cold potable water from step 29 can be added to the fat in step 28. The alkali promotes separation of fat from water. The fat then is filtered in step 31 to remove water from fat and reduce the water content from about 70 to 50 weight percent to about 30 to 20 weight percent. Optionally, the fat can be refrigerated or frozen in step 33. Suitable filtration apparatus include vibrating screen available from Sweco Corporation, located in Florence, Ky. or the like. The screens have a size between about 4000 micron and about 2000 microns, preferably between about 3500 microns and about 2500 microns. Additional base can be added in step 34 to bring the pH of the precipitated proteins back to the original pH of the tissue. This assures that the base (NaOH or $NaHCO_3$) has fully reacted with and consumed all of the previously added acid such as HCL or citric. An optional step is to direct the protein product to a unit operation 35 which removes water to concentrate the liquid for the purpose of creating larger fibers upon raising the pH. The unit operation could consist of any device found to remove water in a continuous or batch manner, such as an evaporator or more desirable an ultrafiltration unit. The amount of water removed can vary, however, greater amounts of water removed results in larger and more robust and sturdy fibers and increased protein recovery. The resultant protein product is a viscous sediment containing protein at a concentration of about 4-14 percent by weight or higher to produce a protein containing solution which is directed to mixing step 34 wherein it is mixed with food grade alkaline 36 such as sodium hydroxide, potassium hydroxide, sodium bicarbonate, or the like. The protein product is precipitated in step 38 and is recovered such as by centrifugation and filtration in step 40. Optionally, an ultra-filtrate retentate having a >5000-10000 molecular weigh cut off (MWCO) is recovered in step 41. This ultrafiltrate has an elevated concentration of myoglobin having a red color and can be blended as desired with the precipitated protein in step 43. This results in a protein product having an improved red color and reduced sodium content. The sodium is concentrated in the lower molecular weight fraction that is discarded. The resultant product has improved red color, desired reduced sodium and is obtained by a process (pH 3.6-4.4) that provides high yield of protein from the trimmings of about 80% or greater. Thus, the process of this invention, provides a greatly improved protein product over the available prior art.

The protein product from step 40 contains 14 percent or greater by weight protein, contains less than 10 percent by weight fat, is produced at a temperature less than 110° F., can be frozen within 30 minutes in step 42 from process completion, does not allow a significant increase in bacteria and, in the embodiment wherein the protein precipitated with alkali does not retain chemicals or additives other than a low concentration of salt such as sodium chloride or the like.

The meat protein products of this invention are not significantly altered by the processing method of this invention. An examination of the proteins associated with the starting meat source and the lean cold processed meats (precipitated refolded protein) shows that the extraction process is mild enough not to effect changes in the proteins throughout the entire process. It also shows that very little to no hydrolysis has occurred during the processing, partly due to the low temperature. Refolding of the protein also does not affect its profile.

In summary, the process of this invention produces protein in higher yields as compared to the prior art, contains fewer microorganisms as compared to the prior art and is in a form by which it can be more easily mixed with meat as compared to the products of the prior art. In addition, the fat product obtained is stabilized against oxidation.

The following examples illustrate this invention and are not intended to limit the same.

Example I

A test was performed to examine the degree of hydrolysis comparing the amount of non-protein nitrogen compared to the amount of protein nitrogen. Results are shown in Table 1 for Lean Cold Processed Pork & Beef made using hydrochloric acid and sodium hydroxide, and unprocessed, raw pork and beef muscle by the process of FIG. 1.

TABLE 1

| Sample # | Non Protein Nitrogen (NPN) (%) | Protein Nitrogen (PN) | Ratio NPN/PN |
|---|---|---|---|
| Raw Beef | 0.26 | 2.47 | 0.11 |
| Lean Cold Processed Beef | <0.02 | 1.48 | <0.01 |
| Raw Pork | 0.47 | 3.20 | 0.15 |
| Lean Cold Processed Pork | 0.05 | 1.62 | 0.03 |

When the ratio of NPN/PN was measured, an average of 0.03 for Lean Cold Processed Pork and an average of 0.15 for raw pork muscle were obtained. The averages for Lean Cold Processed Beef and beef muscle were <0.01 and 0.11, respectively. The higher the percentage of NPN, the greater the amount of hydrolysis has taken place. US Food and Drug (FDA) has set a standard of >0.62 for "highly hydrolyzed" proteins. Values for the Lean Cold Processed Meat proteins indicate very little hydrolysis has occurred, especially since the value is only approximately 20% for pork and <9% for beef of the value found for comparable whole raw meats, which appears to have not undergone much significant hydrolysis.

Finally, the amino acid content is similar between the starting beef and pork muscle and the lean cold processed meat from the same muscle. As shown below in Tables 2 and 3, the amino acid percentages found for both pork or beef show very little differences between the starting muscle and the lean cold processed meat. There were 45.44% essential amino acids in pork muscle and 44.97% in the lean cold processed pork. The beef values were similar with 42.81% essential percentage for the starting beef and 44.90% for the lean cold processed beef.

TABLE 2

Amino acid profile of pork muscle and lean cold processed pork (protein extracted from the same pork muscle using low pH solubilization, processed according to U.S. Pat. No. 6,005,073).

| Amino acid | Protein from Pork (% of total protein) | Low pH solubilized protein from same Pork (% of total protein) |
|---|---|---|
| Aspartic acid | 10.92 | 11.48 |
| Threonine* | 4.53 | 4.59 |
| Serine | 5.17 | 5.22 |
| Glutamic Acid | 17.26 | 17.68 |
| Glycine | 4.85 | 4.17 |
| Alanine | 5.97 | 5.84 |
| Valine* | 4.64 | 4.96 |
| Methionine* | 3.36 | 3.55 |
| Isoleucine* | 4.42 | 4.43 |
| Leucine* | 8.79 | 8.87 |
| Tyrosine | 3.57 | 3.91 |
| Phenylalanine* | 4.90 | 5.16 |
| Lysine* | 10.55 | 10.33 |
| Histidine* | 4.26 | 3.08 |
| Argine | 6.82 | 6.73 |
| Essential amino acids (%) | 45.44 | 44.97 |

TABLE 3

Amino acid profile of beef muscle and lean cold processed beef (protein extracted from the same beef muscle using low pH solubilization, processed according to U.S. Pat. No. 6,005,073

| | Protein from Beef (% of total protein) | Low pH solubilized protein from same Beef (% of total protein) |
|---|---|---|
| Aspartic acid | 10.65 | 10.99 |
| Threonine* | 4.39 | 4.54 |
| Serine | 5.59 | 5.57 |
| Glutamic Acid | 16.25 | 17.44 |
| Glycine | 7.72 | 4.54 |
| Alanine | 6.72 | 5.97 |
| Valine* | 4.46 | 4.46 |
| Methionine* | 2.86 | 3.11 |
| Isoleucine* | 3.79 | 4.14 |
| Leucine* | 8.39 | 9.00 |
| Tyrosine | 3.20 | 3.50 |
| Phenylalanine* | 4.73 | 4.78 |
| Lysine* | 10.79 | 11.70 |
| Histidine* | 3.40 | 3.18 |

TABLE 3-continued

Amino acid profile of beef muscle and lean cold processed beef (protein extracted from the same beef muscle using low pH solubilization, processed according to U.S. Pat. No. 6,005,073

|  | Protein from Beef (% of total protein) | Low pH solubilized protein from same Beef (% of total protein) |
|---|---|---|
| Argine | 7.06 | 7.09 |
| Essential amino acids (%) | 42.81 | 44.90 |

*Essential amino acids are designated

Thus, analytical data of the amino acids and proteins demonstrate that the lean cold processed meat retains the nutritional value, protein profile, and character of meat.

Example 2

From the perspective of microbial reduction, the process for manufacturing refolded protein of this invention has an advantage to the process for lean finely textured meat because in the process of this invention, is processed under cold conditions and the proteins will not solubilize, hence the process will not work without a certain amount of food-grade acid, which inhibits microbes. In other words, in order to obtain specified yields for the product, certain benchmarks in pH, and these pH levels are what inhibits microbes are reached. Thus, there are inherent controls in the processing of the products of this invention that enhance product safety. Analytic tests demonstrate the process effectively produces a 1-3 log reduction of the microbes as compared to the starting meat.

TABLE 4

Microbiological Results for Pork

| Analyte | Starting Pork #1 | Precipitated Pork #1 | Starting Pork #2 | Precipitated Pork #2 | Starting Pork #3 | Precipitated Pork #3 |
|---|---|---|---|---|---|---|
| Aerobic Plate Count | >250000/g | 2900/g | 200000/g | 4200/g | 120000/g | 2800/g |
| Coliform(MPN) | <3/g | <3/g | <3/g | <3/g | <3/g | <3/g |
| E. Coli 0157:H7 | Neg./25 g | Neg./25 g | Neg./25 g | Neg./25 g | Neg./25 g | Neg./25 g |
| Listeria mono. | Neg./25 g | Neg./25 g | Neg./25 g | Neg./25 g | Neg./25 g | Neg./25 g |
| Staphylococci | <10/g | <10/g | <10/g | <10/g | <10/g | <10/g |
| Yeast | 40/g | 20/g | 110/g | <10/g | 690/g | <10/g |
| Mold | 30/g | 10/g | <10/g | <10/g | <10/g | <10/g |

| Analyte | Starting Pork #4 | Precipitating Pork #4 | Starting Pork #5 | Precipitating Pork #5 | Starting Pork #6 | Precipitating Pork #6 |
|---|---|---|---|---|---|---|
| Aerobic Plate Count | 64000/g | 50/g | >250000/g | 240/g | >250000/g | 250/g |
| Coliform(MPN) | <3/g | <3/g | 15/g | 3.6/g | 7.2/g | 3.6/g |
| E. Coli 0157:H7 | Neg./25 g | Neg./25 g | Neg./25 g | Neg./25 g | Neg./25 g | Neg./25 g |
| Listeria mono. | Neg./25 g | Neg./25 g | Neg./25 g | Neg./25 g | Pos./25 g | Neg./25 g |
| Staphylococci | 25/g | <10/g | <10/g | <10/g | <10/g | <10/g |
| Yeast | 570/g | <10/g | 90/g | <10/g | 290/g | <10/g |
| Mold | <10/g | <10/g | <10/g | <10/g | <10/g | <10/g |

TABLE 5

Microbiological Results for Beef

| Analyte | Starting Beef #1 | Precipitated Beef #1 | Starting Beef #2 | Precipitated Beef #2 | Starting Beef #3 | Precipitated Beef #3 |
|---|---|---|---|---|---|---|
| Aerobic Plate Count | 48000/g | 8100/g | >250000/g | 4300/g | >250000/g | 6900/g |
| Coliform(MPN) | 15/g | <3/g | NA | NA | NA | NA |
| E. Coli 0157:H7 | Neg./25 g | Neg./25 g | Neg./25 g | Neg./25 g | Neg./25 g | Neg./25 g |
| Listeria mono. | Neg./25 g | Neg./25 g | Neg./25 g | Neg./25 g | Neg./25 g | Neg./25 g |
| Staphylococci | <10/g | <10/g | <10/g | 18/g | <10/g | <10/g |
| Yeast | <10/g | <10/g | 50/g | <10/g | 10/g | <10/g |
| Mold | 10/g | 30/g | <10/g | <10/g | <10/g | <10/g |

| Analyte | Starting Beef #4 | Precipitating Beef #4 | Starting Beef #5 | Precipitating Beef #5 | Starting Beef #6 | Precipitating Beef #6 |
|---|---|---|---|---|---|---|
| Aerobic Plate Count | 46000/g | 3800/g | 37000/g | 430/g | 33000/g | 2800/g |
| Coliform(MPN) | 3.6/g | <3/g | <3/g | <3/g | <3/g | <3/g |
| E. Coli 0157:H7 | Neg./25 g | Neg./25 g | Neg./25 g | Neg./25 g | Neg./25 g | Neg./25 g |
| Listeria mono. | Neg./25 g | Neg./25 g | Neg./25 g | Neg./25 g | Neg./25 g | Neg./25 g |

TABLE 5-continued

| Microbiological Results for Beef | | | | | | |
|---|---|---|---|---|---|---|
| Staphylococci | <10/g | <10/g | <10/g | <10/g | <10/g | <10/g |
| Yeast | 80/g | 240/g | 20/g | <10/g | 90/g | <10/g |
| Mold | <10/g | <10/g | <10/g | <10/g | <10/g | 10/g |

Example 3

This example illustrates that recovery of protein from meat trimmings must be effected at a pH of 3.6 or above in order to recover a protein product from satisfactory color. This example also illustrates that initially obtaining protein having an unsatisfactory color cannot be reversibly converted to a protein product having a satisfactory color.

The results obtained in Table 6 were obtained with 40 g samples of ground beef. To each sample was added 160 ml of cold tap water (40° F.). The samples were then homogenized to a particle size of about 100 microns. The pH of each sample was adjusted with 1M food grade hydrochloric acid to a pH set forth in Table 6. Each sample was centrifuged for 8 minutes at 5000 g at 4° C. and then filtered through glass wool to separate solid fat from protein liquid composition. 40 ml of each liquid portion was poured into a container on top of white paper. Each sample was then measured twice with each sample with a Minolta colorimeter that measures L*, a* and b* values as set forth above.

The average L*, a* and b* were then computed as shown in Table 6.

TABLE 6

| Color Measurements - Ground Beef | | | | | | | | | |
|---|---|---|---|---|---|---|---|---|---|
| pH | L* (1) | a* (1) | B* (1) | L* (2) | a* (2) | b* (2) | L* (AVG) | a* (AVG) | b* (AVG) |
| 5.8 a | 75.33 | 14.63 | 15.53 | 61.95 | 30.29 | 21.55 | 68.64 | 22.46 | 18.54 |
| 5.8 b | 71.40 | 18.35 | 16.59 | 76.92 | 13.93 | 15.31 | 74.16 | 16.14 | 15.95 |
| 5.8 (AVG) | | | | | | | 71.40 | 19.30 | 17.25 |
| 3.8 a | 56.92 | 25.11 | 21.01 | 58.77 | 23.53 | 20.80 | 57.85 | 24.32 | 20.91 |
| 3.8 b | 55.57 | 26.40 | 21.19 | 59.18 | 23.58 | 20.89 | 57.38 | 24.99 | 21.04 |
| 3.8 (AVG) | | | | | | | 57.61 | 24.66 | 20.97 |
| 3.6 a | 56.01 | 20.38 | 20.46 | 57.35 | 19.46 | 20.54 | 56.68 | 19.92 | 20.50 |
| 3.6 b | 57.72 | 21.47 | 20.92 | 58.63 | 20.90 | 20.81 | 58.18 | 21.19 | 20.87 |
| 3.6 (AVG) | | | | | | | 57.43 | 20.55 | 20.68 |
| 3.5 a | 58.80 | 15.03 | 20.67 | 61.09 | 13.97 | 20.40 | 59.95 | 14.50 | 20.54 |
| 3.5 b | 59.69 | 13.76 | 20.64 | 61.92 | 12.84 | 20.32 | 60.81 | 13.30 | 20.48 |
| 3.5 (AVG) | | | | | | | 60.38 | 13.90 | 20.51 |
| 3.4 a | 57.06 | 14.59 | 20.62 | 61.79 | 12.73 | 20.14 | 59.43 | 13.66 | 20.38 |
| 3.4 b | 57.96 | 14.49 | 20.82 | 60.16 | 13.60 | 20.54 | 59.06 | 14.05 | 20.68 |
| 3.4 (AVG) | | | | | | | 59.24 | 13.85 | 20.53 |
| 3.3 a | 61.58 | 12.33 | 20.52 | 65.48 | 10.78 | 19.50 | 63.53 | 11.56 | 20.01 |
| 3.3 b | 58.78 | 13.62 | 20.84 | 61.65 | 12.45 | 20.38 | 60.22 | 13.04 | 20.61 |
| 3.3 (AVG) | | | | | | | 61.87 | 12.30 | 20.31 |
| 3.3 to 3.8 a | 57.77 | 19.36 | 20.46 | 59.37 | 18.39 | 20.45 | 58.57 | 18.88 | 20.46 |
| 3.3 to 3.8 b | 57.61 | 16.67 | 20.56 | 57.47 | 16.70 | 20.56 | 57.54 | 16.69 | 20.56 |
| 3.3 to 3.8 (AVG) | | | | | | | 58.06 | 17.78 | 20.51 |

Example 4

Reduced Sodium

The sodium contents of regular store bought beef (85% lean ground) and pork (chops) determined and compared those to Lean Finely Textured Beef produced commercially using the process of U.S. Pat. No. 5,871,795 and Lean Cold Processed Beef and Pork. Sodium content was analyzed using an ICP sample preparation and the emission spectrometry method described in AOAC 984.27. Although the HCl and NaOH combine to create water and salt, the salt content of the treated meat is comparable to the untreated meat. It was found through experimentation that the average sodium content of untreated beef is 68.38 mg/100 g and untreated pork is 74.18 mg/100 g. A sample of Lean Finely Textured Beef was found to have 122 mg/100 g. The sodium content in the Lean Cold Processed Beef was 46 mg/100 g and Lean Cold Processed Pork was 71.80 mg/100 g As shown in Table 6, the protein samples processed at pH 3.6, 3.8 and 5.8 have a red color while the protein samples processed at pH 3.3, 3.4 and 3.5 have a brown color. In addition, the protein sample processed at pH 3,3 and then having its pH increased to pH 3.8 retained its brown color initially produced at 3.3. Thus, the production of brown color product can not be converted to a red color product.

Example 5

Fat Oxidation

To examine the extent of oxidation that had occurred to the phase, the thio-barbituric acid reactive substance (TBARS) procedure described by Lemon (1975) (Lemon, D. W. 1975 An Improved TBA test for rancidity, News Series Circular No. 51, Halifax Laboratory, Scotia, Canada). For the control fat from fresh ground beef (80:20) was extracted, mixed with water and placed into a sealed poly bag which was further placed into a water bath at 107° F. After 30 minutes, the mixture was centrifuged for 20 minutes at 3,000×g in a Sorval centrifuge. The lipid phase was drained off and the lipid was placed into Whirl-pak bags and stored at refrigerated temperatures (34-40° F.) for seven days prior to TBARS analysis. This control is how the industry currently produces Lean Finely Textured Beef and the fat phase from this process. Beef fat from the Lean Cold Processed Meat process is extracted using the procedure described above and 1) was placed into Whirl-pak bags and stored at refrigerated temperatures (34-30° F.) for seven days prior to TBARS analysis or was 2) mixed with cold water 50:50 (w/w) and then stored at refrigerated temperatures (34-40° F.) for seven days prior to TBARS analysis.

Controls had a value of 14.25±3.5 nmol/kg of TBARS whereas the (dry) fat samples were found at 64±2.1 nmol/kg and the fat in water samples were found to be 2.7±2.0 nmol/kg. In subsequent experiments the moisture content of the (dry) fat is 26.92% moisture with a peroxide value of 0.25 meq/kg, and the fat with water sample to be 57.31% moisture with a peroxide number of <0.02 meq/kg. Peroxides were measured using the Peroxy Safe method (AOAC 03050). Controls had extensive oxidation when compared to Lean Cold Processed Fat samples. It is peculiar that the fat samples stored with water had lower oxidation values than the fat stored dry. Typically higher moisture contents in fats leads to higher rates of oxidation. It may be that there was so much water that it diluted out the pre-oxidants and made the oxidation reactions less active.

Example 6

Lean Cold Processed Beef was made for comparison purposes using 1. hydrochloric acid and sodium hydroxide and 2. citric acid and sodium bicarbonate. Ground beef trim was mixed with cold water at a 1:4 ratio of beef to water. The mixture was homogenized using a Kitchen Aid hand-held mixer for 1 minute on high speed. One aliquot was reduced to pH 3.6 using 2N HCl and another aliquot had its pH adjusted to pH 3.6 using 2N citric acid. The resultant products were filtered through a metal screen with 1/16 inch perforations. Both filtrates were adjusted to pH 5.5 using 4M sodium hydroxide (HCl sample) or 6% (w/w) sodium bicarbonate (citric acid sample). Product was filtered again to remove water. The final pH of the final product was adjusted to pH 6.5 using additional sodium hydroxide or sodium bicarbonate. Product was frozen and sent to Silliker Laboratories for proximate and sodium analyses.

TABLE 7

Analytical Data for Lean Cold Processed Beef made using Different Acids and Bases

| Analyte | Result | Method |
| --- | --- | --- |
| HCL/NaOH | | |
| Ash | 0.23 | AOAC 920.153 |
| Carbohydrate | 0.74 | Calculation |
| Fat | 4.68 | AOAC 960.39 |
| Moisture | 79.60 | AOAC 991.46Bb |
| Protein | 14.75 | AOAC991.20.1 |
| Salt | 0.17 | AOAC 983.14 |
| Citric/Sodium bicarbonate | | |
| Ash | 0.31 | AOAC 920.153 |
| Carbohydrate | .033 | Calculation |
| Fat | 4.49 | AOAC 960.39 |
| Moisture | 80.15 | AOAC 991.46Bb |
| Protein | 14.72 | AOAC991.20.1 |
| Salt | 0.05 | AOAC 983.14 |

Results demonstrates that both acid/base combinations produce final products that meet USDA chemical specifications for Lean Finely Textured Beef (LFTB) of ≥14% protein and <10% fat. Both samples were also reddish/pink in color which is also a USDA requirement for LFTB and both had a mild beef taste with no off-tastes or odors.

Example 7

Sturdiness

Fresh beef (85% lean) was placed into a mixing container and cold water was added at a 1:4 ratio (beef:water). The mixture was homogenized using a Kitchen Aid hand mixer on high speed for 2 min. The homogenate was then adjusted to pH 3.6 using hydrochloric acid (2M). Product was centrifuged in a Sorvall Model RC-5B centrifuge for 20 minutes at 8,000 RPM. The acidified solution was accurately adjusted, by the addition of cold water, to 2.5% Brix using a hand-held refractometer. A sample of the starting material was taken. Two gallons of the remaining solution was placed into a ultrafiltration test unit (Koch Membrane, Wilmington, Mass.) equipped with a 720034 column for water removal. Product was run for 1.05 hrs until the refractometer displayed a reading of 5% Brix. Individually the products were adjusted to pH 5.5 using sodium hydroxide (4M) and the precipitates were collected for analysis.

The precipitated products made from the 2.5% Brix and 5.0% Brix solutions were measured for fiber length development and sturdiness of the fibers. Sturdiness was determined by placing equal 200 g beef weights (minus the water weights) on a 1000 micron screen and swirling under constant motion for 2 minutes before weighing the resultant retentate.

The fiber length of precipitated product made from the starting solution of 2.5% Brix ranged between 0.5 to 1.0 mm, compared to the fiber length made from 5% Brix material which ranged from 1.5% Brix to 5 mm in length. The smaller size of the 2.5% Brix particles required centrifugation to effectively collect the precipitate, whereas the larger fibers were collected in a 1/16 inch wire screen.

To determine sturdiness the average weights of the precipitated products after the swirling filtering step were taken. The results were 127 g from the 5% Brix solution and 82 g from the 2.5% Brix solutions. This represents a 54.9% increase in yield if one captures the precipitated product from a 5% Brix solution versus obtaining the same product from a 2.5% solution. We refer this as sturdiness because what appears to happen with the product from the 2.5% solution, is that the swirling motion causes a shearing of the product which reduces its particle size and allows more to pass through the 1000 micron screen. The swirling shear action appears to not be able to reduce the particle size of the 5% Brix product.

The invention claimed is:

1. A process for recovering from meat trimmings containing fat and protein a protein composition having a color of 75 to 52 L*, 25 to 15 a*, and 23 to 16 b*, wherein the meat trimmings are obtained from beef and wherein the meat trimmings have an average fat content between about 50% and 80% by weight and a lean content between about 20% and 50% by weight, said process comprising the steps of:
  a) comminuting the meat trimmings in water,
  b) adding a food grade acid to the comminuted meat trimmings to effect a pH in the range of 3.6 to 4.4 thereby to solubilize the protein,
  c) after addition of the food grade acid in step b), separating solid fat from solubilized protein, and
  d) adding a food grade alkali to the solubilized protein to increase the pH in the solubilized protein and to precipitate the solubilized protein to produce a precipitated protein composition with a color of 75 to 52 L*, 25 to 15 a*, and 23 to 16 b*, wherein the precipitated protein composition has 14% or greater by weight protein and less than 10% by weight fat.

2. The process of claim 1 wherein said pH in step b is in the range of 3.6 to 3.8.

3. The process of claim 1 wherein a food grade acid is added in step a.

4. The process of claim 2 wherein a food grade acid is added in step a.

5. The process of claim 1 wherein said food grade acid is taken from the group of citric acid and hydrochloric acid.

6. The process of claim 2 wherein said food grade acid is taken from the group of citric acid and hydrochloric acid.

7. The process of claim 3 wherein said food grade acid is citric acid and said food grade alkali is sodium bicarbonate.

8. The process of claim 4 wherein said food grade acid is citric acid and said food grade alkali is sodium bicarbonate.

9. The process of any of claims 1 through 8 additionally comprising filtering the precipitated protein composition thereby to produce a filtrate thereof and a protein composition as a retentate thereof, ultra-filtrating the filtrate to obtain a myoglobin rich solution, and mixing the protein composition and the myoglobin rich solution.

10. The process of claim 1 wherein water is removed from said protein in step c. prior to adding said food-grade alkali.

11. The process of claim 10 wherein a food-grade acid is added in step a.

12. The process of any one of claims 10 or 11 wherein said food-grade acid is a food-grade citric acid and food-grade alkali is a food grade sodium bicarbonate.

13. The process of any one of claims 10 or 11 wherein said food-grade acid is a food-grade citric acid.

14. A process for recovering from meat trimmings a protein composition having a color of 75 to 52 L*, 25 to 15 a*, and 23 to 16 b* and containing water soluble and non-water soluble proteins, wherein the meat trimmings are beef trimmings and wherein the meat trimmings have an average fat content between about 50% and 80% by weight and a lean content between about 20% and 50% by weight, said process comprising the steps of:
   a) comminuting the meat trimmings in water,
   b) adding a food grade acid to the comminuted meat trimmings to effect a pH in the range of 3.6 to 4.4 thereby to solubilize the protein,
   c) after addition of the food grade acid in step b), separating solid fat from the solubilized protein; and
   d) adding a food grade alkali to the solubilized protein to precipitate the solubilized protein to produce the protein composition having a color of 75 to 52 L*, 25 to 15 a*, and 23 to 16 b*, wherein the precipitated protein composition has 14% or greater by weight protein.

15. The process of claim 14 wherein said pH in step b is in the range of 3.6 to 3.8.

16. The process of claim 14 wherein a food grade acid is added in step a.

17. The process of claim 15 wherein a food grade acid is added in step a.

18. The process of claim 14 wherein said food grade acid is taken from the group of citric acid and hydrochloric acid.

19. The process of claim 15 wherein said food grade acid is taken from the group of citric acid and hydrochloric acid.

20. The process of claim 16 wherein said food grade acid is citric acid and said food grade alkali is sodium bicarbonate.

21. The process of claim 17 wherein said food grade acid is citric acid and said food grade alkali is sodium bicarbonate.

* * * * *